US009667164B2

(12) United States Patent
Raubo et al.

(10) Patent No.: US 9,667,164 B2
(45) Date of Patent: May 30, 2017

(54) VOLTAGE-SOURCE CONVERTER FULL BRIDGE MODULE IGBT CONFIGURATION AND VOLTAGE-SOURCE CONVERTER

(71) Applicant: Alstom Technology, Ltd., Baden (CH)

(72) Inventors: Roman Raubo, Downingtown, PA (US); Marek Furyk, Boyerstown, PA (US)

(73) Assignee: ALSTOM TECHNOLOGY, LTD., Baden (CH)

( * ) Notice: Subject to any disclaimer, the term of this patent is extended or adjusted under 35 U.S.C. 154(b) by 0 days.

(21) Appl. No.: 14/318,464

(22) Filed: Jun. 27, 2014

(65) Prior Publication Data
US 2015/0381071 A1 Dec. 31, 2015

(51) Int. Cl.
*H02M 7/00* (2006.01)
(52) U.S. Cl.
CPC .................... *H02M 7/003* (2013.01)
(58) Field of Classification Search
CPC H01L 2924/13055; H02M 2007/4835; H02M 7/49; H02M 1/088; H02M 7/162; H02M 7/1623
USPC ....................... 257/E25.016; 363/129, 37, 87
See application file for complete search history.

(56) References Cited

U.S. PATENT DOCUMENTS

| 5,642,275 A * | 6/1997 | Peng ........................ H02M 7/49 363/137 |
| 6,442,051 B1 | 8/2002 | Ryan et al. |
| 2004/0024937 A1 * | 2/2004 | Duncan ................. H02M 7/003 710/100 |
| 2005/0174817 A1 * | 8/2005 | Schmidt ................... H02M 7/48 363/97 |
| 2011/0019442 A1 * | 1/2011 | Yamada ................... H02M 1/14 363/44 |
| 2012/0200165 A1 | 8/2012 | Känsälä |
| 2013/0003309 A1 * | 1/2013 | Stella ................ H01L 23/49562 361/715 |
| 2014/0177292 A1 * | 6/2014 | Woodford ................. H02J 3/36 363/35 |
| 2014/0240006 A1 | 8/2014 | Furyk et al. |
| 2014/0246914 A1 | 9/2014 | Chopra et al. |

OTHER PUBLICATIONS

Office Action for U.S. Appl. No. 13/781,685, mailed Aug. 5, 2015.

* cited by examiner

*Primary Examiner* — David Vu
*Assistant Examiner* — Jonathan Han
(74) *Attorney, Agent, or Firm* — Nixon Peabody, LLP; Khaled Shami

(57) ABSTRACT

The invention relates to a full Bridge module, for connecting an electrical device such as a DC capacitor to an electrical circuit. The full bridge module comprises: a first and a second terminal to connect to the electrical circuit; a third and a fourth terminal to connect to the electrical device. The full bridge module further comprises a first to a fourth switch that connect the first and the second terminal to the third and fourth terminal. The first and the second switches are arranged on a first surface, the third and the fourth switches being arranged on a second surface that is parallel to the first surface. The invention relates also to a Voltage-source converter.

7 Claims, 4 Drawing Sheets

VOLTAGE-SOURCE CONVERTER FULL BRIDGE MODULE IGBT CONFIGURATION AND VOLTAGE-SOURCE CONVERTER

TECHNICAL DOMAIN

The invention relates to the domain of the voltage-source converters, and more precisely to the full bridge modules that are comprised in such voltage-source converters.

PREVIOUS ART

Some electrical circuit, like the one of a voltage-source converter can comprise at least a full-bridge module which connects the remaining of the circuit with an electrical device such as a DC capacitor. Such a full-bridge module comprises switches to control the polarization of the connection between the remaining of the circuit and the electrical device. The switches, as the example shown on FIG. 1, can be Insulated Gate Bipolar Transistors, called IGBT, with a first connecting terminal of the switch which is an emitter of the IGBT and the second connecting terminal of the switch which is a collector of the IGBT.

Such full bridge module 100 comprises, as illustrated on FIGS. 2a and 2b:
- a first and a second terminal 111, 112 that is connected in used to the remaining of the circuit 20,
- a third and a fourth terminal 113, 114 that is connected in used to the DC capacitor 30,
- a first IGBT 120 which has an emitter 121 connected to the first terminal 111 and a collector 125 connected to the third terminal 113,
- a second IGBT 130 which has a collector 135 connected to the first terminal 111 and an emitter 131 connected to the fourth terminal 114,
- a third IGBT 140 which has an emitter 141 connected to the second terminal 112 and a collector 145 connected to the third terminal 113,
- a fourth IGBT 150 which has a collector 155 connected to the second terminal 112 and an emitter 151 connected to the fourth terminal 114.

In the usual configuration, as illustrated on FIG. 2a, the first and the third IGBT 120, 140 are fixed in thermal connection on a first heat sink whereas the second and fourth IGBT are fixed in thermal connection on a second heat sink. In this configuration, the first and second heat sink, materialize a surface on which all the IGBT are arranged.

The full bridge module 100 further comprises, as illustrated on FIGS. 2a and 2b, to connect each IGBT to the appropriate terminals:
- a first bus bar 171 that is connected to the emitter 121 of the first IGBT 120 and to the collector 135 of the second IGBT 130, and which comprises the first terminal 111,
- a second bus bar 172 that is connected to the emitter 141 of the third IGBT 140 and to the collector 155 of the fourth IGBT 150, which comprises the second terminal 112,
- a third bus bar 173 that is connected to the collector 125 of the first IGBT 120 and to the collector 145 of the third IGBT 140, which comprises the third terminal 113,
- a fourth bus bar 174 that is connected to the emitter 131 of the second IGBT 130 and to the emitter 151 of the fourth IGBT 150, which comprises the fourth terminal 114.

Each bus bar 171, 172, 173, 174 is planar and is extending, at least partially, parallel to the surface on which all the IGBT 120, 130, 140, 150 are arranged.

With this prior art's configuration of a full bridge module 100, it is possible to connect the electrical device to the remaining of the circuit with a total control of the polarization of the connection.

But, such configuration presents some drawbacks regarding the compactness of the module and the sizing of the bus bars. In such configuration, as illustrated on FIG. 2b, the module possesses a lateral surface that cannot be less than four times the surface of one switch, i.e in this example the surface of one IGBT. In the same way, the third and fourth bus bars have to cover the entire lateral surface of the module and the first and the second bus bars each one covers nearly half of the lateral surface of the module.

PRESENTATION OF THE INVENTION

The invention is aimed to resolve these drawbacks.

In this purpose, the invention relates to a full bridge module, for connecting an electrical device such as a DC capacitor to an electrical circuit, comprising:
- a first and a second terminal to connect to the electrical circuit,
- a third and a fourth terminal to connect to the electrical device,
- a first switch, which has a first connecting terminal connected to the first terminal and a second connecting terminal connected to the third terminal,
- a second switch, which has a first connecting terminal connected to the fourth terminal and a second connecting terminal connected to the first terminal,
- a third switch, which has a first connecting terminal connected to the second terminal and a second connecting terminal connected to the third terminal,
- a fourth switch which has a first connecting terminal connected to the fourth terminal and a second connecting terminal connected to the second terminal.

The first and the second switches are arranged on a first surface, and the third and the fourth switches are arranged on a second surface that is parallel and that is facing the first surface.

With such arrangement of the switches on two parallel surfaces which are facing each other, the lateral surface of the module can be reduce to the dimension of only two switches and so presents lateral dimensions until two times inferior than a prior art's module.

Furthermore, with such arrangement in which the first and the second switches are facing the third and the fourth switches, the bus bars need only to cover in maximum the surface of two switches and so can be significantly reduced in size in comparison to the ones of a prior art's module.

Additionally, with the possibility of reduction of the surface of the third and the fourth bus bar, it is possible to design a module with a two layers bus bars configuration and in this way improving the heat evacuation of the module.

Each switch could be an Insulated Gate Bipolar Transistor, called IGBT, with the first connecting terminal which is an emitter of the IGBT and the second terminal which is a collector of the IGBT.

The collector of the first IGBT could face the collector of the third IGBT and wherein the emitter of the second IGBT could face the emitter of the fourth IGBT.

Each IGBT could comprises at least two emitter's contacts for the emitter and at least two collector's contacts for the collector, and wherein each collector's contacts of the first IGBT is facing a corresponding collector's contact of the third IGBT of the second IGBT is facing a corresponding emitter's contact of the fourth IGBT.

With such configurations of the module, the connection of the first IGBT to the third IGBT and the connection of the second IGBT with the fourth IGBT are particularly easy to carry out.

The first and second surface could be respectively the surface of a first and a second heat sink, the first and the second IGBT being in thermal connection to the first heat sink, the third and the fourth IGBT being in thermal connection to the second heat sink.

Such module presents a heat dissipation efficient thanks to the heat dissipation on both edge of the module. Furthermore with such configuration, the first and the second heat sink can confine the explosion of the IGBT within the module and help to increase the security of such module.

The emitter of the first IGBT and the collector of the second IGBT could define a first part of the first surface, the collector of the first IGBT and the emitter of the second IGBT defining a second part of the first surface that is distinct from the first part, and wherein the emitter of the third IGBT and the collector of the fourth IGBT could define a first part of the second surface that is facing the first part of the first surface, the collector of the third IGBT and the emitter of the fourth IGBT defining a second part of the second surface that is distinct from the first part of the second surface, the second part of the second surface being facing the second part of the first surface.

This configuration is particularly efficient for the connection between the IGBT and for the optimization of the bus bar dimensions that are used for this connection.

The full bridge could further comprises:
a first bus bar which is connected to the emitter of the first IGBT and to the collector of the second IGBT, and which comprises the first terminal,
a second bus bar which is connected to the emitter of the third IGBT and to the collector of the fourth IGBT, and which comprises the second terminal,
a third bus bar which is connected to the collector of the first IGBT and to the collector of the third IGBT, and which comprises the third terminal,
a fourth bus bar that is connected to the emitter of the second IGBT and to the emitter of the fourth IGBT, and that comprises the fourth terminal,
wherein each bus bar is planar and disposed between the first and second surface, all the bus bar being parallel to the first and second surface.

The first and the second bus bar could be disposed between the first parts of the first and second surface,
and wherein the third and the fourth bus bar could be disposed between the second parts of the first and second surface.

The collector of the first IGBT could comprise at least a collector's contact of the first IGBT, that is complementary to an corresponding the collector's contact of the third IGBT to electrically connect together the collector of the first and of the third IGBT,
wherein at least one of the collector's contact of first and of the third IGBT could settle the third bus bar on the corresponding IGBT.

With such configuration the operator that build the module does not need supplementary element for settle the bus bars on the IGBTs.

The emitter of the second IGBT could comprise at least an emitter's contact member that is complementary to an corresponding emitter's contact of the emitter of the fourth IGBT to electrically connect together the emitters of the second and of the fourth IGBT,
wherein one of the emitter's contact of the emitter of the second and of the fourth IGBT fixing the fourth bus bar.

With such configuration, the connection of the first to the third IGBT and of the second to the fourth does not need any bus bar. This reduces the current that passes in the bus bars and so reduces the heating of the bus bar by Joule effect.

The invention is also related to a Voltage-source converter that comprises:
at least a full bridge module (10), and
a DC capacitor (30),
the full bridge module (10) being a full bridge module of the invention.

Such voltage-source converter beneficiates from the advantages of a module of the invention.

BRIEF DESCRIPTION OF THE DRAWINGS

The present invention will be better understood with the reading of the specification of a furnished embodiment which does not limit the scope of the invention. This specification refers to the annexed drawings in which.

Same or similar parts in the different drawings use the same numerical reference to make easier the passage from one drawing to another.

DETAILED PRESENTATION OF PARTICULAR EMBODIMENTS

Figure 1:
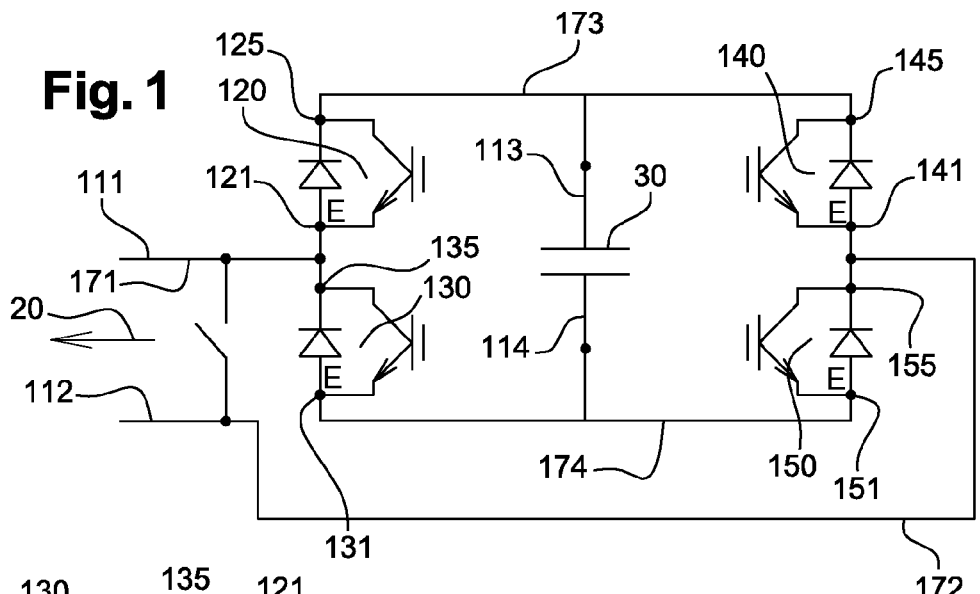
FIG. 1 shows an electrical block diagram of a full bridge module according to the invention and to the previous art, FIGS. 2*a* and 2*b* respectively show the configuration of the IGBT of a previous art's full bridge module, and an exploded view of previous art's full bridge module.

FIG. 1 shows the electrical block diagram of a full bridge module 10 according to the invention and to the previous art that connect a DC capacitor 30 to an electrical circuit 20 such as the remaining of a source-voltage converter.

In the full bridge module 10 shows on FIG. 1, the switches are Insulated Gate Bipolar Transistors 120, 130, 140, 150, called IGBT, with for each IGBT, an emitter 121, 131, 141, 151 that forms a first connecting terminal and a collector 125, 135, 145, 155 that forms a second connecting terminal.

Figure 3:
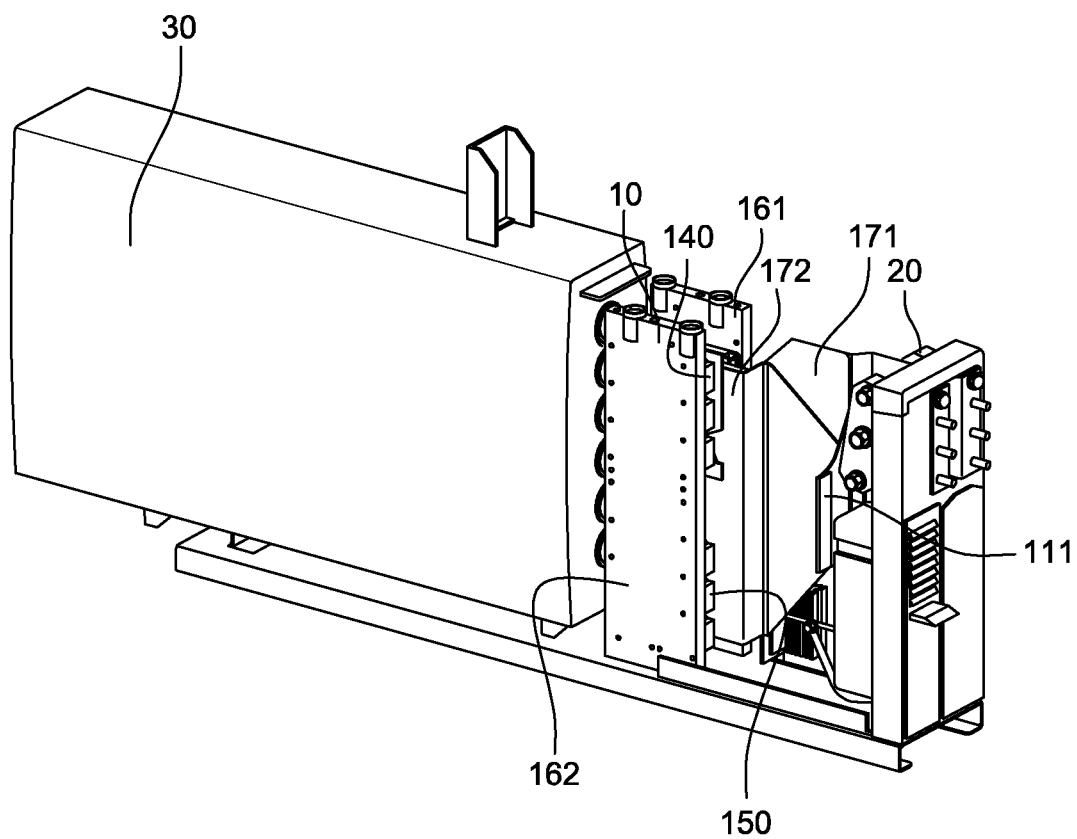
FIG. 3 shows a full bridge module according to the invention that is connected to a DC capacitor, FIGS. 4*a* and *b* show a full bridge according to the invention respectively with the second heat sink that is detached from the first one and in a exploded view.
Figure 4A:
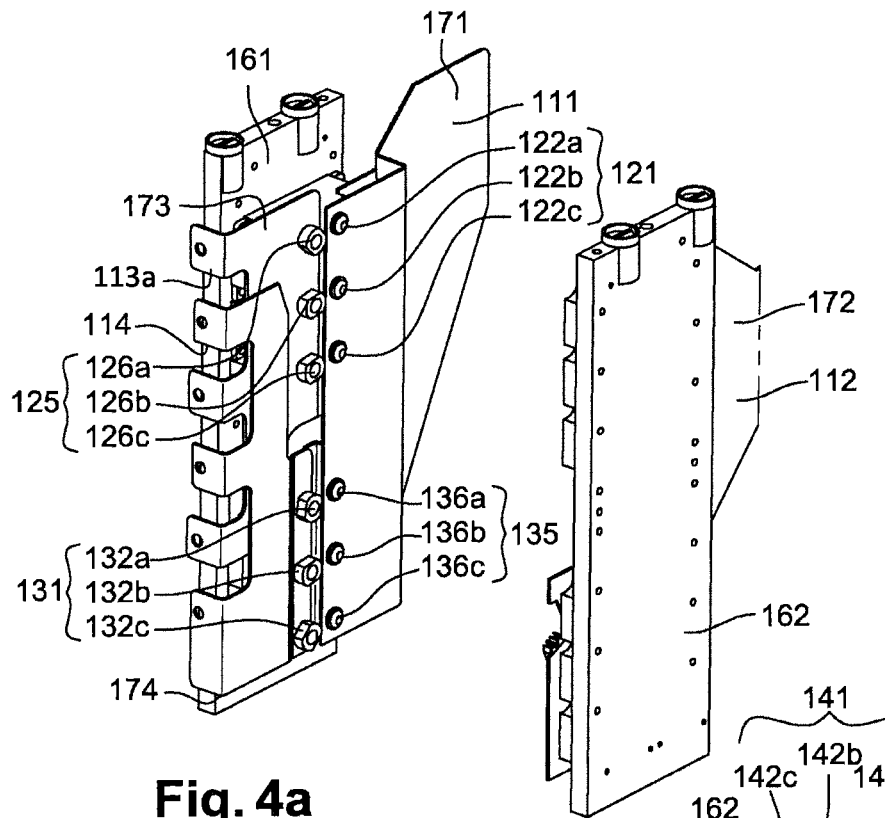
Figure 4B:
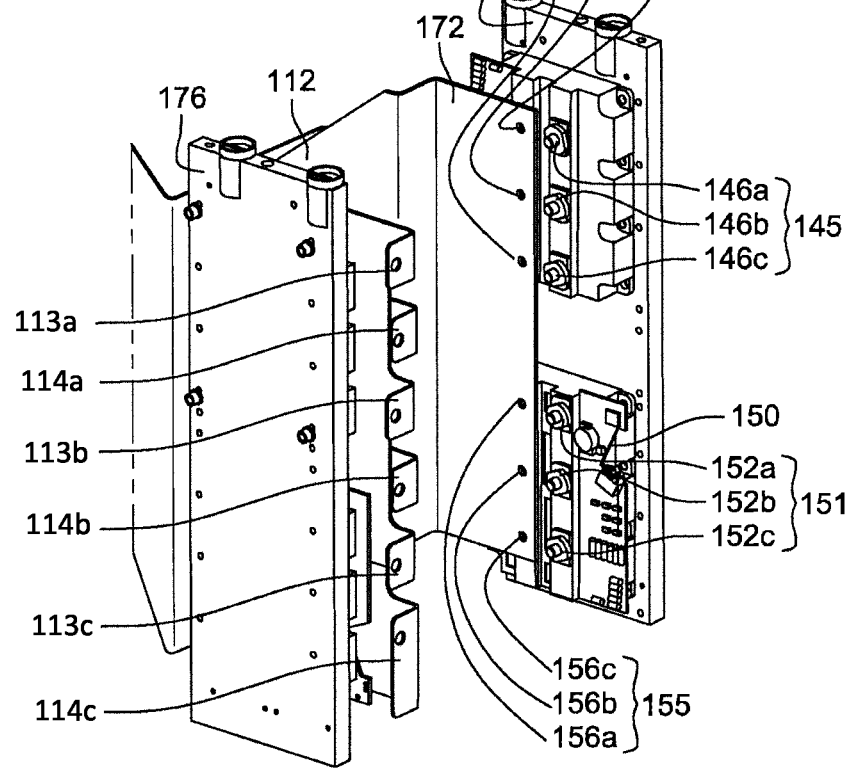
Figure 5:
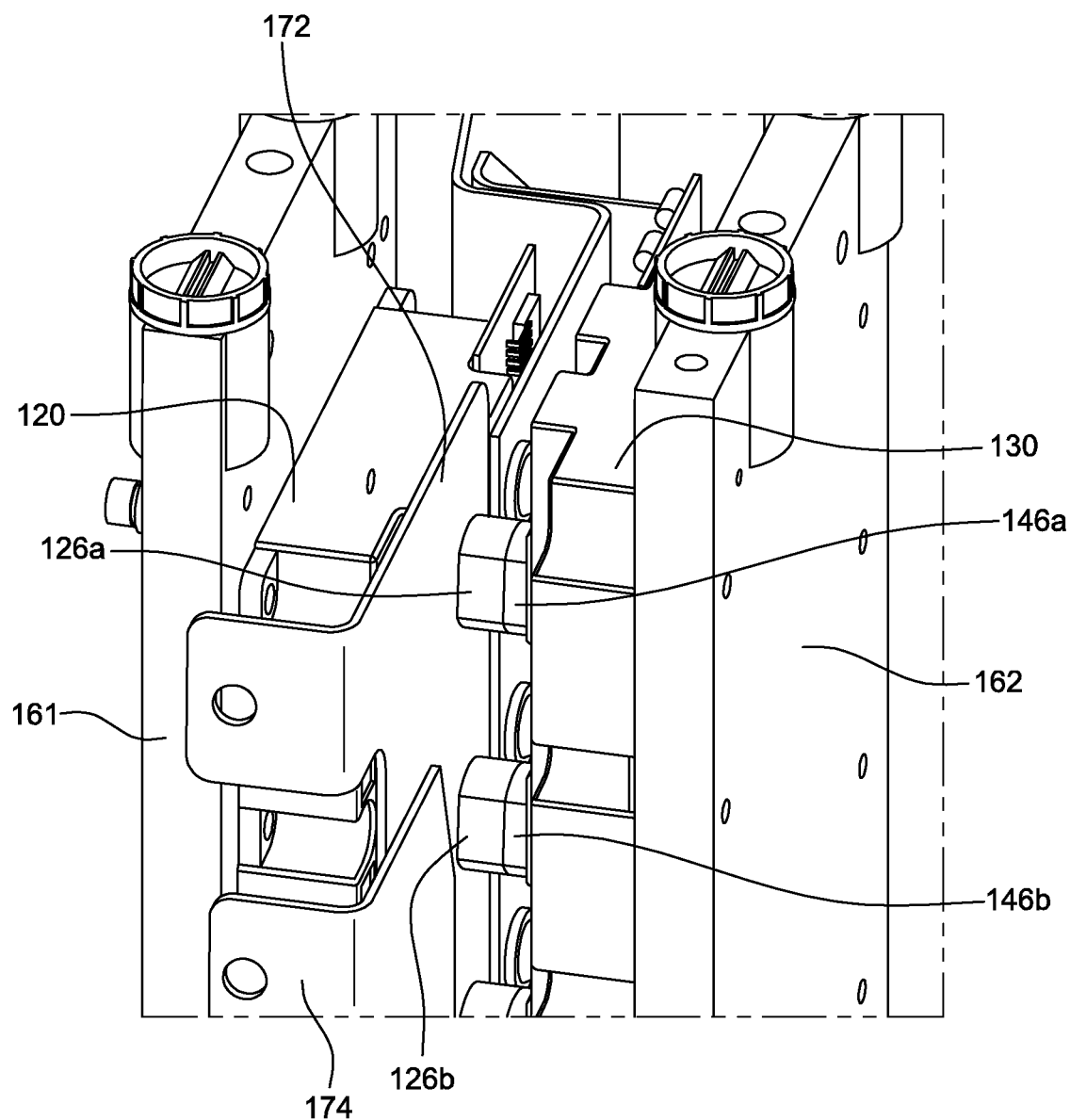
FIG. 5 shows a three-fourth view that showing the connection members of the first and the third IGBT.

The full bridge module 10 comprises as illustrated on FIGS. 3, 4*a* and 4*b*:
a first and a second terminal 111, 112 that is connected to the electrical circuit 20,
a third and a fourth terminal 113, 114 that are connected to the DC capacitor 30 terminals,
a first IGBT 120 which has an emitter 121 connected to the first terminal 111 and a collector 125 connected to the third terminal 113,
a second IGBT 130 which has a collector 135 connected to the first terminal 111 and an emitter 131 connected to the fourth terminal 114,
a third IGBT 140 which has an emitter 141 connected to the second terminal 112 and a collector 145 connected to the third terminal 113, a fourth IGBT 150 which has a collector 155 connected to the second terminal 112 and an emitter 151 connected to the fourth terminal 114, a first heat sink 161 on which the first and the second IGBT 120, 130 are fixed, a second heat sink 162 on which the third and the fourth IGBT 140, 150 are fixed, a first bus bar 171 that is connected to the emitter 121 of the first IGBT 120 and to the collector 135 of the second IGBT 130, and which comprises the first terminal 111, a second bus bar 172 that is connected to the emitter 141 of the third IGBT 140 and to the collector 155 of the fourth IGBT 150, that comprises the second terminal 112, a third bus bar 173 that is connected to the collector 125 of the first IGBT 120 and to the collector 145 of the third IGBT 140, that comprises the third terminal 113, a fourth bus bar 174 that is connected to the emitter 131 of the second IGBT 130 and to the emitter 151 of the fourth IGBT 150, that comprises the fourth terminal 114.

Figure 2A:
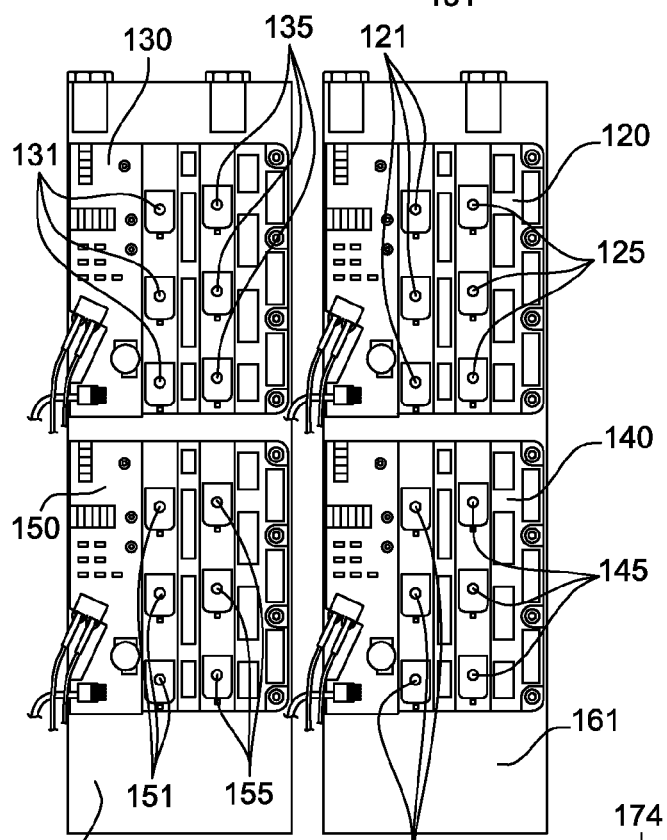
Figure 2B:
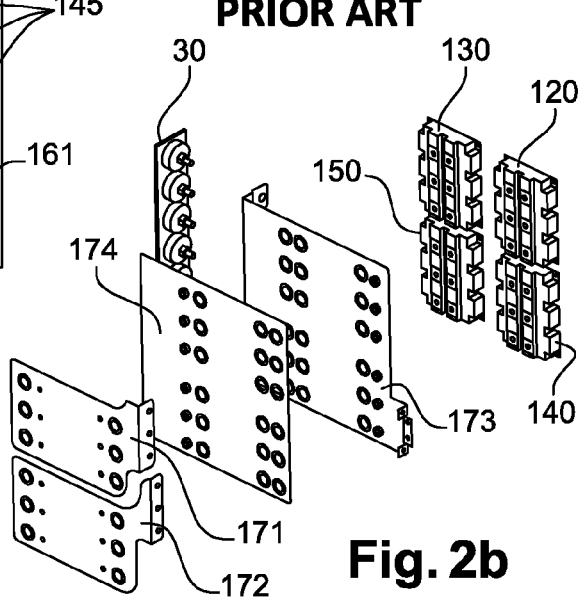

Similarly than the previous art's full bridge module shown on FIGS. 2a and 2b, each IGBT 120, 130, 140, 150 comprises three emitter's contacts 122a, 122b, 122c, 132a, 132b, 132c, 142a, 142b, 142c, 152a, 152b, 152c for the emitter 121, 131, 141, 151 and three collector's contacts 126a, 126b, 126c, 136a, 136b, 136c, 146a, 146b, 146c, 156a, 156b, 156c for the collector 125, 135, 145, 155.

As illustrated on FIG. 3, the full bridge module of the invention is disposed to make an interface between the DC capacitor 30 and the electrical circuit with the possibility to control the polarization of the connection between them.

The first and the second IGBT 120, 130 are arranged on a first face of the first heat sink 161 in such manner that the first heat sink 161 materializes a surface on which the first and the second IGBT 120, 130 are arranged. The first and the second IGBT 120, 130 arrangements on the first face of the first heat sink 161 is done in such manner that the first and the second IGBT 120, 130 are in heat connection with the first heat sink 161. The first and the second surface are parallel and are facing each other.

The emitter's contacts 122a, 122b, 122c, 132a, 132b, 132c and the collector's contacts 126a, 126b, 126c, 136a, 136b, 136c of the first and second IGBT 120, 130 extend from the first face of the first heat sink 161 in the direction of the second heat sink 162.

The emitter's contacts 122a, 122b, 122c of the first IGBT 120 and the collector's contacts 136a, 136b, 136c of the second IGBT 130 define a first part of the first heat sink 161

In the same way, the collector's contacts 126a, 126b, 126c of the first IGBT 120 and the emitter's contact 132a, 132b, 132c of the second IGBT 130 define a second part of the first heat sink 161 that is distinct of the first part.

The first part and the second part are respectively the longitudinal part of the first heat sink 161 that is close to the electrical circuit 20 and the longitudinal part of the heat sink 161 that is close to the DC capacitor 30.

In this way, the first bus bar 171 that connect the emitter 121 of the first IGBT 120 and the collector 135 of the second IGBT 130 to the first terminal is extending only in front of the first part of the first heat sink 161. The first bus bar 171 is planar and is parallel to the first surface of the first heat sink 161.

The first bus bar 171 is electrically connected to the emitter 121 of the first IGBT 120 and to the collector 135 of the second IGBT 130. The connection of the first bus bar 171 to the emitter 121 of the first IGBT and the settlement of the first bus bar 171 on the first IGBT 120 are provided by the emitter's contacts 122a, 122b, 122c of the first IGBT 120. For this purpose each emitter's contact 122a, 122b, 122c is a contact screw that screws the first bus bar 171 on the first IGBT 120. In the same manner, to provide the connection of the first bus bar 171 to the collector 135 of the second IGBT 130 and to settle the first bus bar 171 on the collector 135 of the second IGBT 130, each collector's contacts 136a, 136b, 136c of the second IGBT 130 is a screw contact that screws the first bus bar 171 on the second IGBT 130.

The first bus bar 171 is connected by the first terminal 111 to the electrical circuit 20.

The third and the fourth bus bar 173, 174 are planar. The third and the fourth bus bar 173, 174 extend only in front of the second part of the first heat sink 161 parallel to each other and to the first surface of the first heat sink 161.

The third bus bar 173 is connected to the collector 125 of the first IGBT 120 by the means of the collector's contacts 126a, 126b, 126c of the first IGBT 120. For this purpose, each one of the three collector's contacts 126a, 126b, 126c of the first IGBT 120 is a screw contact that screws the third bus bar 173 on the collector 125 of the first IGBT 120. Each one of the three collector's contacts 126a, 126b, 126c of the first IGBT 120 comprises a screw head that is complementary in shape to a screw head of a corresponding collector's contact 146a, 146b, 146c of the third IGBT 140 to electrically connect together the collector's contacts 126a, 126b, 126c, 146a, 146b, 146c of the first and of the third IGBT 120, 140.

The collector's contacts 126a, 126b, 126c of the first IGBT 120 and collector's contact 146a, 146b, 146c of the third IGBT 140 connect the collector 125 of the first IGBT 120 to the collector 145 of the third IGBT 140 and respectively connect the collector 125 of the first IGBT 120 and the collector 145 of the third IGBT to the third bus bar 173.

The third bus bar 173 comprises three terminal connectors 113a, 113b, 113c that form the third terminal 113. The three terminal's connectors 113a, 113b, 113c of the third bus bar 173 are intercalated between three terminal's connectors 114a, 114b, 114c of the fourth bus bar 174 that form the fourth terminal 114.

With this configuration the three terminal connectors 113a, 113b, 113c of the third bus bar 113 connect the third bus bar 113 to the DC capacitor 30 with a good current dispatching without interacting with the three terminal connectors 114a, 114b, 114c of the fourth bus bar 174.

The fourth bus bar 174 presents a similar configuration than the third bus bar. The fourth bus bar 174 is thus connected to the emitter 131 of the second IGBT 130 by the emitter's contact 132a, 132b, 132c of the second IGBT 130. For this purpose, each one of the three emitter's contacts 132a, 132b, 132c of the second IGBT 130 is a screw contact that screws the fourth bus bar 174 on the second IGBT 130. Each one of the three emitter's contacts 132a, 132b, 132c of the second IGBT 130 comprises a screw head that is complementary in shape to the shape of the corresponding emitter's contact 152a, 152b, 152c of the fourth IGBT 150 to electrically connect together the emitter's contacts 132a, 132b, 132c, 152a, 152b, 152c of the second and of the fourth IGBT 130, 150.

The emitter's contact 132a, 132b, 132c of the second IGBT 130 and the emitter's contacts 132a, 132b, 132c electrically connect the emitter 131 of the second IGBT 130 to the emitter 151 of the fourth IGBT 150 and respectively connect the emitter 131 of the second IGBT 130 and the emitter 151 of the fourth IGBT to the fourth bus bar 174.

The third and the fourth IGBT 140, 150 are arranged on a first face of the second heat sink 162 in such manner that the second heat sink 162 materializes a second surface on which the third and the fourth IGBT 140, 150 are arranged, this second surface being parallel to the first surface of the first heat sink 161. The first face of the second heat sink 162 is facing the first face of the first heat sink 161.

The emitter's contacts 142*a*, 142*b*, 142*c*, 152*a*, 152*b*, 152*c* and the collector's contacts 146*a*, 146*b*, 146*c*, 156*a*, 156*b*, 156*c* of the third and fourth IGBT 140, 150 extend from the first face of the second heat sink 162 in the direction to the first heat sink 161.

As for the first heat sink 161, the emitter's contacts 142*a*, 142*b*, 142*c* of the third IGBT 140 and the collector's contacts 156*a*, 156*b*, 156*c* of the fourth IGBT 150 define a first part of the second heat sink 162.

The collector's contacts 146*a*, 146*b*, 146*c* of the third IGBT 140 and the emitter's contact 152*a*, 152*b*, 152*c* of the fourth IGBT 150 define a second part of the second heat sink 162 that is distinct from the first part.

The first part of the second heat sink 162 is the one that is facing the first part of the first heat sink 161 whereas the second part of the second heat sink 162 is the one that is facing the second part of the first heat sink 163.

The second bus bar 172 that connects the emitter 141 of the third IGBT 140 and the collector 155 of the fourth IGBT 150 to the second terminal 112 is extending only in front of the first part of the second heat sink 162. The second bus bar 172 is planar and is parallel to the first surface of the second heat sink 162.

The second bus bar 172 is electrically connected to the emitter 141 of the third IGBT 140 and to the collector 155 of the fourth IGBT 150.

The connection of the second bus bar 172 to the emitter 141 of the third IGBT and the settlement of the second bus bar 172 on the third IGBT 140 are provided by the emitter's contacts 142*a*, 142*b*, 142*c* of the third IGBT 140. Each emitter's contacts 142*a*, 142*b*, 142*c* of the third IGBT 140 is a contact screw that screws the second bus bar 172 on the third IGBT 140. The connection of the second bus bar 172 to the collector 155 of the fourth IGBT 150 and the settlement of the second bus bar 172 on the collector 155 of the fourth IGBT 150 are provided by the collector's contacts 156*a*, 156*b*, 156*c* of the fourth IGBT 150 that are screw contacts that screw the second bus bar 172 on the fourth IGBT 150.

The first bus bar 171 is connected by the first terminal 111 to the electrical circuit 20.

The collector's contacts 146*a*, 146*b*, 146*c* of the third IGBT 140 are each one facing a corresponding collector's contacts 126*a*, 126*b*, 126*c* of the first IGBT 120. With such arrangement of the collector's contacts 146*a*, 146*b*, 146*c* of the third IGBT 140 relatively to the collector's contacts 126*a*, 126*b*, 126*c* of the first IGBT 120 together with the complementary in shape of the collector's contacts 126*a*, 126*b*, 126*c*, 146*a*, 146*b*, 146*c* of the first and third IGBT 120, 140, the collector 145 of the third IGBT 140 is in electrical contact with both the third bus bar 173 and the collector of the first IGBT 120.

The emitter's contacts 152*a*, 152*b*, 152*c* of the fourth IGBT 150 are each one facing a corresponding emitter's contacts 132*a*, 121*b*, 132*c* of the second IGBT 130 in such way to put it in electrical contact with both the fourth bus bar 174 and the emitter of the second IGBT 120. To furnish this electrical contact the emitter's contacts 132*a*, 132*b*, 132*c*, 152*a*, 152*b*, 152*c* of the second and fourth IGBT 130, 150 are complementary in shape.

With such configuration, the module presents only a two layers configuration of bus bars, the first and second bus bars that extend facing the first parts of the heat sinks 161, 162 and the third and fourth bus bar that extend facing the second parts of the heat sinks 161, 162. The safety of this module is also guaranteed by the fact that the IGBTs 120, 130, 140, 150 are surrounded by the first and the second heat sink 161, 162 thereby protecting from a possible explosion of one of the IGBT 120, 130, 140, 150.

The invention claimed is:

1. A full bridge module for connecting an electrical device to an electrical circuit, comprising:
    a first and a second terminal to connect to the electrical circuit,
    a third and a fourth terminal to connect to the electrical device,
    a first switch, which has a first connecting terminal connected to the first terminal and a second connecting terminal connected to the third terminal,
    a second switch, which has a first connecting terminal connected to the fourth terminal and a second connecting terminal connected to the first terminal,
    a third switch, which has an first connecting terminal connected to the second terminal and a second connecting terminal connected to the third terminal,
    a fourth switch which has a first connecting terminal connected to the fourth terminal, a second connecting terminal connected to the second terminal,
    wherein the first and the second switches are arranged on a first surface of a first support, and wherein the third and the fourth switches are arranged on a second surface of a second support, the second surface of the second support being parallel and facing the first surface of the first support, and
    wherein the first switch is facing the third switch and the second switch is facing the fourth.

2. The full bridge module of claim 1, wherein each switch is an Insulated Gate Bipolar Transistor, called IGBT, with the first connecting terminal which is an emitter of the IGBT and the second terminal which is a collector of the IGBT.

3. The full bridge module of claim 2, wherein the collector of the first IGBT is facing the collector of the third IGBT and wherein the emitter of the second IGBT is facing the emitter of the fourth IGBT.

4. The full Bridge module of claim 3, wherein each IGBT comprises at least two emitter's contacts for the emitter and at least two collector's contacts for the collector, and wherein each collector's contacts of the first IGBT is facing a corresponding collector's contact of the third IGBT and each emitter's contact of the second IGBT is facing a corresponding emitter's contact of the fourth IGBT.

5. The full Bridge module of claim 3, wherein the first and second support are respectively a first and a second heat sink, the first and the second IGBT being in thermal connection to the first heat sink, the third and the fourth IGBT being in thermal connection to the second heat sink.

6. The full Bridge module of claim 3, wherein the emitter of the first IGBT and the collector of the second IGBT define a first part of the first surface, the collector of the first IGBT and the emitter of the second IGBT defining a second part of the first surface that is distinct from the first part,
    and wherein the emitter of the third IGBT and the collector of the fourth IGBT define a first part of the second surface that is facing the first part of the first surface, the collector of the third IGBT and the emitter of the fourth IGBT defining a second part of the second surface that is distinct from the first part of the second surface, the second part of the second surface being facing the second part of the first surface.

7. A Voltage-source converter that comprises:
at least a full bridge module, and
a DC capacitor,
the voltage-source converter being characterized in that the full bridge module is a full bridge module of claim 1.

* * * * *